United States Patent [19]

Ohsaki et al.

[11] Patent Number: 4,932,981
[45] Date of Patent: Jun. 12, 1990

[54] APPARATUS FOR THE PRODUCTION OF GAS

[75] Inventors: Kozo Ohsaki, Funabashi; Hirohisa Uozu; Hideaki Yanaru, both of Chiba, all of Japan

[73] Assignee: Toyo Engineering Corporation, Tokyo, Japan

[21] Appl. No.: 137,456

[22] Filed: Dec. 23, 1987

[30] Foreign Application Priority Data

Dec. 25, 1986 [JP] Japan ................................ 61-310388

[51] Int. Cl.⁵ .............................................. B01J 7/00
[52] U.S. Cl. ...................................... 48/94; 422/197; 422/200; 422/211; 48/198.7
[58] Field of Search ............... 48/196 A, 94; 423/602; 422/196, 197, 200, 201, 211

[56] References Cited

U.S. PATENT DOCUMENTS

| | | | |
|---|---|---|---|
| 1,959,151 | 5/1934 | Beekley | 423/652 |
| 4,098,587 | 7/1978 | Buswell et al. | 48/94 |
| 4,098,588 | 7/1978 | Buswell et al. | 48/94 |
| 4,098,589 | 7/1978 | Buswell et al. | 48/94 |
| 4,315,893 | 2/1982 | McCallister | 48/196 A |

FOREIGN PATENT DOCUMENTS

| | | |
|---|---|---|
| 41-7278 | 4/1966 | Japan . |
| 53-78983 | 7/1978 | Japan . |
| 53-79767 | 7/1978 | Japan . |
| 53-79768 | 7/1978 | Japan . |
| 59-16536 | 1/1984 | Japan . |
| 61-77601 | 4/1986 | Japan . |

*Primary Examiner*—Peter Kratz
*Attorney, Agent, or Firm*—Flynn, Thiel, Boutell & Tanis

[57] ABSTRACT

The heat required for the steam reforming reaction is generated by flameless catalytic combustion. The heat thus-generated is passed to a steam reforming reactor zone by means of heat pipes.

4 Claims, 3 Drawing Sheets

4,932,981

APPARATUS FOR THE PRODUCTION OF GAS

BACKGROUND OF THE INVENTION

1. Field of the Invention

This invention relates to an apparatus for the production of a gaseous mixture composed mainly of hydrogen from a hydrocarbon or hydrocarbon mixture as a raw material.

2. Description of the Prior Art

There is an increasing importance of fuel cells as a means of power generation. Accordingly, small-sized apparatuses, which permit a reliable, simple and economical production of hydrogen as a fuel for fuel cells, are desired.

There have been made a variety of proposals of small-sized apparatuses for converting hydrocarbons to hydrogen by steam reforming.

The prior art includes Japanese Patent Laid-Open Nos. 78983/1978, 79767/1978 and 79768/1978.

These laid-open patents disclose small-sized apparatuses for the steam reforming of hydrocarbons.

Specifically, there are disclosed steam reforming apparatuses in each of which a plurality of reactors, each composed by packing a catalyst for the steam reforming reaction in the space between the opposite tube walls in a double tube consisting of an outer tube, and an inner tube are disposed densely in parallel in the combustion furnace section from which the heat required for the steam reforming reaction is supplied.

All of these apparatuses are so designed that the space is made as small as possible in the combustion furnace section and the heat of combustion generated by flame combustion in the combustion furnace section thus-miniaturized is imparted to a gaseous mixture comprising hydrocarbon(s) and water vapor flowing through the space among catalyst granules by way of the outer tube wall of each reactor through convection heat transfer or radiation heat transfer, thus permitting the steam reforming reaction to proceed.

There is, however, a limitation in minimizing the space of the combustion furnace section.

The heat radiation of a gas is extremely small as compared with that of a solid.

It is impossible to produce a heat flux necessary for the steam reforming reaction, unless the combustion flame and combustion gas of a high-temperature gas in the combustion furnace section have a considerable thickness.

Consequently, even in these prior art processes, solid materials, which are raised to high temperatures by being heated by the combustion flame and combustion gas and impart the necessary heat to the surface of the outer wall of each reactor, are packed partially in the space of the combustion furnace section.

The apparatus is constructed in such a way that fuel and air fed to the combustion furnace section are burned to produce flame in the space where the solid materials are not packed and thus impart the heat of radiation to the surface of the outer wall of the reactor and the combustion gas is then passed through a packed bed of the solid materials to heat the packed bed and thereby to heat the surface of the outer wall of the reactor which is kept in contact with the packed bed.

As a part of the prior art processes there may be mentioned Japanese Patent Laid-Open Nos. 16536/1984 and 77601/1986 previously applied by the assignee of the present invention.

Japanese Patent Laid-Open No. 16536/1984 is characterized in that a radiation plate having a large surface area is equipped in the interior of the inner tube in a tubular reactor.

Japanese Patent Laid-Open No. 77601/1986 is featured by the provision of fins or studs with large surface areas on the outside of the outer tube of a tubular reactor.

SUMMARY OF THE INVENTION

The object of the present invention is to miniaturize as far as possible the apparatus for producing a gaseous mixture containing hydrogen as a chief component.

The present inventors have intended to provide an apparatus further smaller in size than the steam reforming apparatus proposed by the prior art.

DETAILED DESCRIPTION OF THE INVENTION

The apparatus of the present invention is a gas production apparatus making use of the catalytic steam reforming reaction.

The catalyst useful for the promotion of the reaction employs nickel as a chief effective component.

For the purpose of preventing the deposition of carbon, an alkali or alkaline earth metal or other components are incorporated as a catalyst component to moderate the high activity of nickel.

Figure 1:
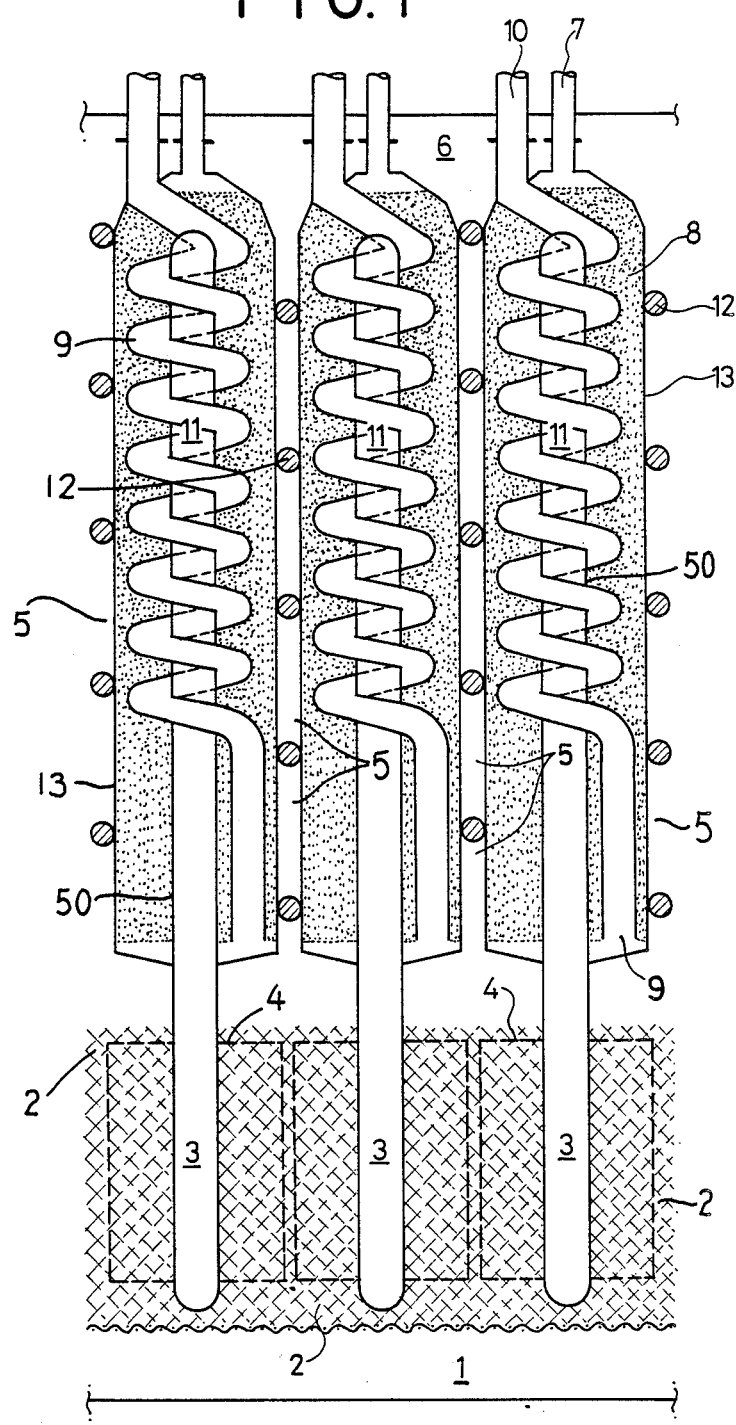
FIG. 1 is a drawing showing a longitudinal section of a prototype apparatus of the present invention.

The catalyst is packed in the space surrounding the outer surface of an inner tube, and further, in an embodiment as in FIG. 1, in the space between the inner surface of an outer tube and the outer surface of the opposite inner tube.

A tube through which a gaseous mixture having undergone the catalytic reaction is discharged to the outside of the reactor is buried in the granular layer of the catalyst as needed.

The heat required for the steam reforming reaction is supplied from the outer surface of one or more inner tubes provided in the reactor and, in an embodiment as in FIG. 1, additionally from the inner surface of the outer pipe which is the outer wall of the reactor.

The inner tube arranged in the reactor is the condensation section of a heat pipe.

The heat pipe is a high-temperature heat pipe the interior of which is kept at a high vacuum and packed with metallic sodium, metallic lithium or the like.

A prototype of the heat pipe is disclosed in Japanese Patent Publication No. 7278/1966.

It is sometimes desirable to dispose the heat pipe with inclination or vertically rather than arranging it horizontally. The tubular or pipy (pipe-shape) reactor may preferably be arranged vertically.

In the present invention, a loop- or helical type heat pipe may be used so as to give a large freedom to the design of constitution/configuration of the reactor.

If necessary, fins or studs are provided on the outer surface of the condensation section of the heat pipe which is equipped in the reactor, thereby enlarging the heat transfer surface.

The vaporization section of the heat pipe is provided in the catalyst bed for combustion reaction.

A fuel and an oxygen-containing gas such as air are supplied to the catalyst bed for combustion reaction to undergo flameless combustion.

The heat generated by the flameless combustion is absorbed into the vaporization section of the heat pipe.

Accumulation of the heat generated by the flameless combustion in the combustion catalyst bed is suppressed by the provision of the vaporization section of the heat pipe.

With a view toward increasing the effect of suppressing the accumulation of the heat generated, fins or studs are also attached onto the outer surface of the vaporization section of each heat pipe, as occasion demands.

In order to prevent local accumulation of the heat generated, a charge path through which a fuel and an oxygen-containing gas such as air are distributed uniformly in the catalyst bed and a discharge path of the combustion gas are distributed in the catalyst bed, if necessary.

The outer diameter of the vaporization section of the heat pipe may be the same as or different from that of the condensation section.

A heat insulation portion may be arranged in the part between the vaporization section of the heat pipe in the catalyst bed for combustion reaction and the condensation section of the heat pipe in the reactor for steam reforming. In the apparatus of the present invention, the part joining to the outer wall of the reactor functions as the heat insulation portion.

When a heat pipe is disposed horizontally in the apparatus of the present invention, both terminal parts of the heat pipe may function as the condensation section and the central part thereof may function as the vaporization section. Alternatively, both terminal parts of the heat pipe may function as the vaporization section, while the central part thereof may function as the condensation section.

In such cases, it is possible to use a heat pipe, both terminal parts of which are at the same height and the central part of which is curved or bent so as to be higher or lower than the terminal parts.

In the practice of the present invention, the reactors may be arranged in parallel in as small a space as possible to attain a required capacity. The outer diameters thereof may, however, be differentiated among neighboring reactors to increase the efficiency of the space.

A suitable gap is provided between neighboring reactors to recover the waste heat of the combustion gas and discharge the combustion gas.

For this purpose, the outer wall of each reactor may be wound round like a vine or helically with a linear material having a diameter corresponding to the gap of a desired dimension.

The helical winding may be made dense at the inlet side and sparse at the outlet side so that the flow velocity of the combustion gas may be controlled.

It is a common practice to make circular the cross section of the outer wall of each reactor. In this case, a large opening is formed needlessly among the outer walls of the reactors occasionally.

Baffle plates for the induction of the combustion gas, fire-resistant radiant bodies or the like are provided in this section.

It is effective for the reduction of the volume of the apparatus to make the outer wall of each reactor hexagonal in cross section, when the steam reforming reaction is carried out under low pressures or the outer diameter of the reactor is small.

The apparatus of the present invention will be illustrated with reference to the drawings.

Figure 2B:
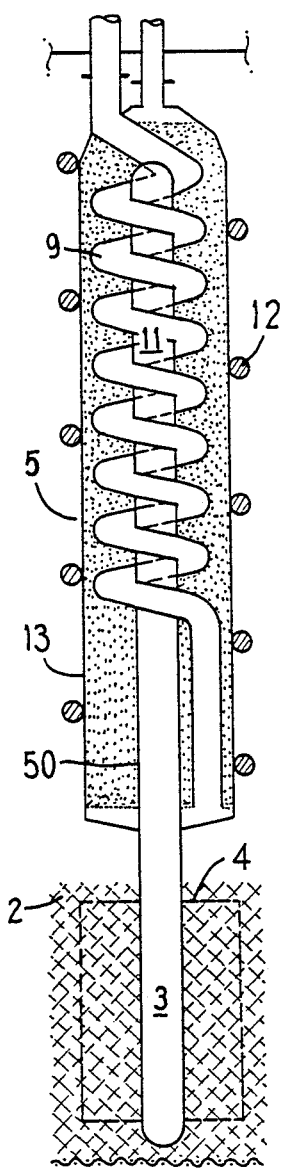
FIGS. 2A and 2B are drawings illustrating the temperature distributions at the respective positions within the apparatus.
Figure 2A:
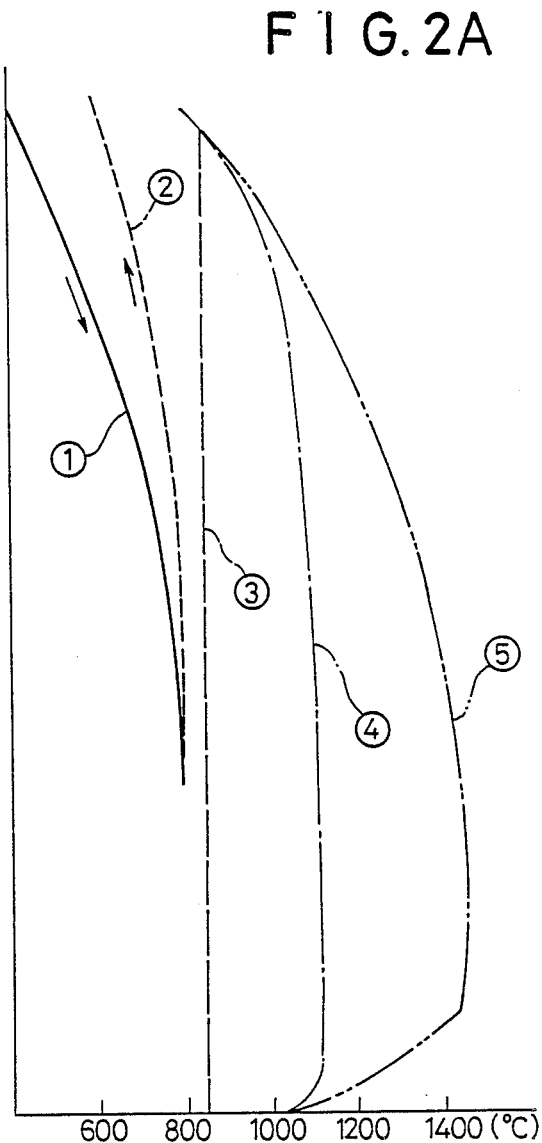

FIG. 1 is a drawing showing a longitudinal section of a prototype apparatus of the present invention. FIGS. 2A and 2B are drawings illustrating the temperature distributions at the respective positions within the apparatus.

Fuel and air are charged in an inlet room 1 in FIG. 1. The fuel/air mixture is introduced into a combustion catalyst bed 2 where it burns flamelessly.

The combustion gas formed by the flameless combustion imparts heat to the vaporization section 3 of each heat pipe 50 directly or by way of the catalyst bed 2.

For the purpose of preventing excessive temperature rise in the catalyst bed 2 due to the flameless combustion, plate fins 4, which extend radially from the outer wall of the vaporization section 3 into the catalyst bed 2, are provided in the apparatus illustrated in FIG. 1.

It is very important for the maintenance of the combustion catalyst to prevent excessive temperature rise in the catalyst bed 2.

Joint use of the vaporization section 3 of the heat pipe and the fins 4 prevents completely the temperature from rising excessively in the catalyst bed 2.

The maximum allowable amount of the feed fuel and oxygen-containing gas to be retained and burned in the catalyst bed 2 is increased by the perfect prevention of the excessive temperature rise.

The combustion gas leaving the catalyst bed 2 is allowed to flow through a gap 5 provided between reactors 13 by a spiral spacer 12 which is wound around each reactor 13 while the combustion gas heats the outer wall of each reactor. The combustion gas arrives at a collecting section 6 of the combustion gas.

The combustion gas is sent to a subsequent heat recovery apparatus such as an air preheater via an exhaust port (not shown in the drawing) provided at the collecting section 6.

The gasification feed material, i.e., a gaseous hydrocarbon, is introduced together with steam into a catalyst bed 8 for steam reforming in the reactor 13 through a feed nozzle 7 and is converted therein to a gaseous mixture containing hydrogen in accordance with the reaction illustrated by the following reaction formulae:

$$C_mH_n + mH_2O \rightarrow (m+n/2)H_2 + mCO$$

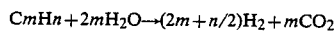

$$C_mH_n + 2mH_2O \rightarrow (2m+n/2)H_2 + mCO_2$$

The high-temperature gaseous mixture thus-formed is passed to the lower end of the catalyst bed 8 for steam reforming and discharged from a reactor outlet nozzle 10 by way of a waste heat recovery pipe 9 so as to be sent to a purification step.

The steam reforming reaction illustrated by the foregoing reaction formulae is an endothermic reaction so that the heat of reaction required is supplied by each heat pipe.

The heat of flameless combustion supplied to the vaporization section 3 of the heat pipe causes vaporization of the metallic sodium in the vaporization section 3 of the heat pipe.

The vapor of metallic sodium is passed at a high speed through a hollow path in each heat pipe to a condensation section 11 of the heat pipe located above the vaporization section, and is condensed on the surface of the inner wall of the condensation section 11, thereby imparting the condensation latent heat to the catalyst bed 8 for steam reforming through the wall of the heat pipe.

The metallic sodium thus-condensed is sent rapidly back to the vaporization section by means of a wick in each heat pipe.

The temperature distributions of the materials in the apparatus of FIG. 1 are illustrated in FIGS. 2A and 2B.

In FIG. 2A, the ordinate of the diagram given on the right corresponds to the longitudinal distance of the apparatus of FIG. 2B given on the left and a temperature scale (°C.) is graduated on the abscissa.

The curve ⑤ in the diagram given on the right in FIG. 2A shows the temperature distribution of the combustion gas when the combustion gas formed by flameless combustion in the catalyst bed 2 heats the outer wall of each reactor 13 without using any heat pipe.

The curve ④ indicates the temperature distribution of the combustion gas in the apparatus of the present invention in which heat pipes are used.

When heat pipes are not used, the temperature in the catalyst bed 2 will be as high as 1,500° C.

It is difficult to prepare a combustion-reaction catalyst which is able to function stably at such a high temperature for a long period of time.

In the case of using heat pipes, the temperature in the catalyst bed 2 is 1,100° C. at the highest as indicated by the curve ④.

The temperature difference of 400° C. is ascribed to an extremely large rate of heat transfer in the heat pipe.

Owing to the extremely large rate of heat transfer, the curve ③ showing heat pipe temperature is substantially straight.

The curves ① and ② illustrate the temperature distribution of the stream in the gasification step in the apparatus of the present invention in which heat pipes are used.

Figure 3:
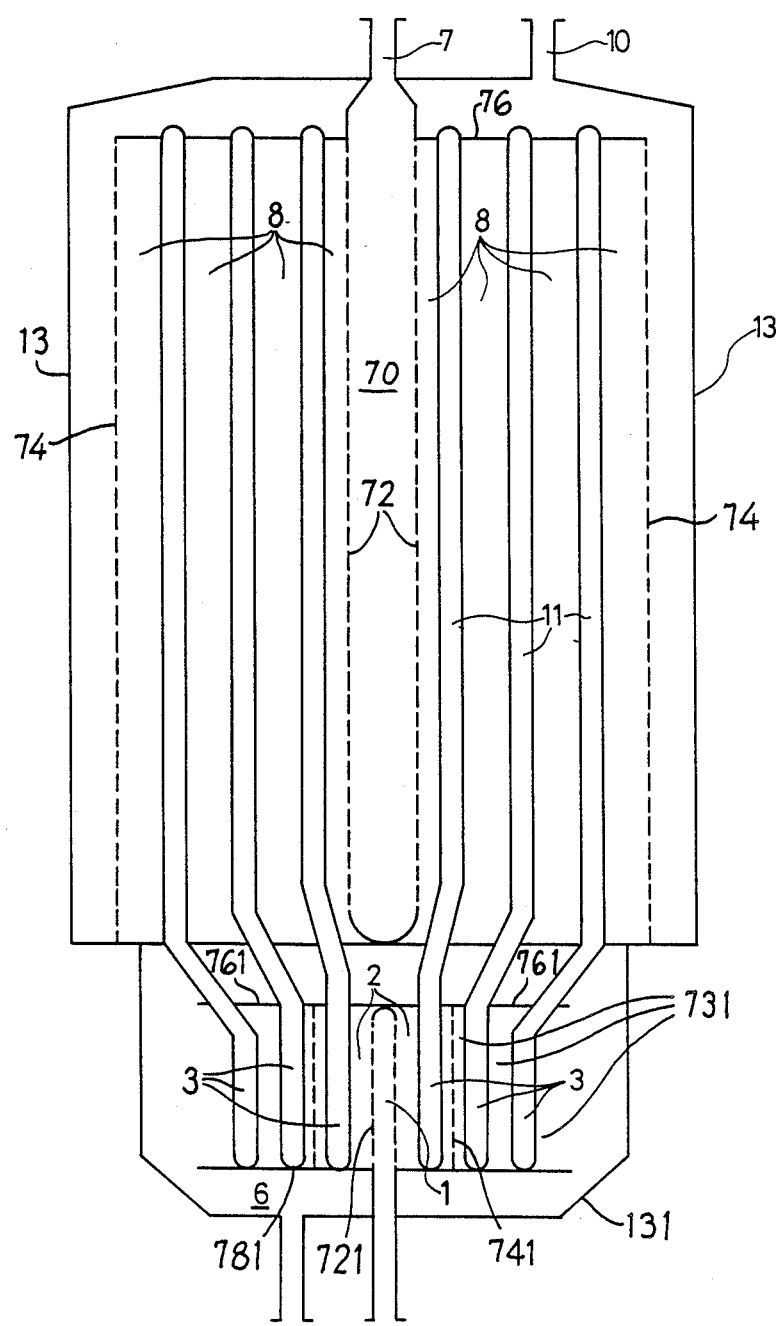
FIG. 3 is a drawing showing a longitudinal section of an apparatus of the type in which reactor 13 is unified, each of its combustion and reforming catalyst beds are also integrated, groups of heat pipes are disposed vertically on concentric circles, and the stream of reactant gases and the stream of combustion gas are allowed to flow through the respective catalyst beds horizontally and radially either inwards or outwards.

In FIG. 3, a mixture of steam and raw material hydrocarbon gas fed through supply tube 7 comes down into central space 70, then radially flows out through inner gas permeable partition wall 72, steam reforming catalyst bed 8, and outer gas permeable partition wall 74 into the surrounding space between the outer partition wall and the cylindrical portion of the shell of the reactor 13, goes up in the surrounding space, and then goes out of the reactor through the top space between the top partition wall 76 and the ceiling of the shell of the reactor and through the product outlet tube 10.

During this procedure, the fed mixture is steam-reformed by steam reforming catalyst and by the heat supplied from the condensation section 11 of the heat pipes vertically positioned in the reforming catalyst bed.

Similarly, fuel and oxygen containing gas flows through inlet room 1, inside partition wall 721, combustion catalyst bed 2, outside partition wall 741, open surrounding space 731 between upper partition wall 761 and lower partition wall 781, and then down to the burnt gas collecting section 6 below the lower partition wall 781 and within the combustion section shell 131.

When the fuel-oxygen mixture radially passes the combustion catalyst bed 2, the fuel is flamelessly burnt and the heat generated is transferred to the vaporization section 3 of the heat pipes arranged in the combustion catalyst bed. The burnt gas flowing radially through open surrounding space 731 also transfers heat to the vaporization section 3 of the heat pipes therein.

Thus, more heat supply to the upstream portion of the reforming catalyst bed 8 with regard to the flow of the gas to be reformed is made possible than to the downstream portion.

However, there may be another embodiment where vaporizing section of all of the heat pipes are positioned in the combustion catalyst bed.

EXAMPLE

An Example is described as follows by using an apparatus shown in FIG. 1. In the Example, 24 reactors are used in the apparatus to take various data, corresponding to the gas volume required for a fuel cell with an output power of 200 KW.

Composition of hydrocarbons used as raw material (vol%)

| | |
|---|---|
| $CH_4$ | 88.5 |
| $C_2H_6$ | 4.6 |
| $C_3H_8$ | 5.4 |
| $i\text{-}C_4H_{10}$ | 0.7 |
| $n\text{-}C_4H_{10}$ | 0.8 |
| Total | 100.0 |
| Feed rate of hydrocarbons used as raw material (kg/hr) | 50.1 |
| Feed rate of steam (kg/hr) | 201.2 |
| Temperature of feed stream to steam-reforming reactor (°C.) | 380 |
| Nickel content in steam-reforming catalyst (wt. %) | 8.0 |
| Amount of steam-reforming catalyst (l) | 180 |

Composition of gas formed by steam-reforming reaction (vol.%)

| | |
|---|---|
| $CH_4$ | 1.7 |
| $H_2$ | 48.9 |
| CO | 7.1 |
| $CO_2$ | 7.6 |
| $H_2O$ | 34.7 |
| Total | 100.0 |
| Amount of gas formed by steam-reforming reaction ($Nm^3$) | 447.3 |
| Temperature of discharge steam from steam-reforming reactor (°C.) | 473 |
| Condensation section of heat pipe, outer diameter (mm) | 50 × 24 |
| Condensation section of heat pipe, length (mm) | 1,000 |
| Condensation section of heat pipe, temperature (°C.) | 825 |
| Kind of fuel for heating reactors; same as raw material for reforming mentioned above | |
| Feed rate of fuel for heating reactors | 155 |
| Feed rate of air for combustion ($Nm^3$/hr) | 256 |
| Content of effective component (Pd or Pt) in catalyst for combustion reaction (wt. %) | 2–3 |
| Amount of catalyst for combustion reaction (l) | 0.5 |
| Temperature of combustion gas at the outlet of catalyst bed for combustion reaction (°C.) | 1,100 |
| Vaporization section of heat pipe, outer diameter (mm) | 50 |
| Vaporization section of heat pipe, length (mm) | 250 |
| Vaporization section of heat pipe, temperature (°C.) | 825 |
| Temperature of combustion gas at | 670 |

What is claimed is:

1. An apparatus for producing a reaction product gas, said apparatus being elongated and having first and second opposite longitudinal ends, comprising: combustion catalyst bed means positioned close to said first longitudinal end of said apparatus; first feeding means for feeding a stream of a fuel mixture of a gaseous fuel and an oxygen-containing gas to said combustion catalyst bed means, said first feeding means comprising an inlet chamber located at said first longitudinal end of said apparatus, whereby the stream of said fuel mixture is fed through said inlet chamber into said combustion catalyst bed means and the fuel is catalytically burned therein to generate heat of combustion and a flue gas; first exhaust means for discharging the flue gas from said apparatus, said first exhaust means comprising a collecting section located at the said second longitudinal end of said apparatus; means defining a plurality of elongated gasification catalyst beds having first and second opposite longitudinal ends corresponding to said first and second longitudinal ends of said apparatus, said gasification catalyst beds being positioned between said combustion catalyst bed means and said collecting section, each of said gasification catalyst beds having an elongated longitudinally extending heat pipe associated therewith, said gasification catalyst beds being arranged parallel to and spaced from each other to provide flow passageways therebetween so that said flue gas can flow from said combustion catalyst bed means to said collecting section; second feeding means for feeding a reactant mixture of hydrocarbon and a gasification agent to said gasification catalysts beds, said second feeding means comprising feeding pipe means extending through said collecting section and communicating with the adjacent second longitudinal ends of said gasification catalyst beds so that said reactant mixture is fed through said gasification catalyst beds and is reacted therein to generate reaction product gas; second exhaust means for discharging the reaction product gas from said apparatus, said second exhaust means comprising withdrawing tube means extending through said collecting section and through said gasification catalyst beds to the first longitudinal ends of said gasification catalyst beds so that the reaction product gas that reaches the first longitudinal ends of said gasification catalyst beds flows through said withdrawing tube means and is discharged from said apparatus;

said elongated heat pipes extending in the same longitudinal direction as said gasification catalyst beds, each of said heat pipes having a vaporization section positioned in said combustion catalyst bed means and a condensation section positioned in its associated gasification catalyst bed so that said heat pipes receive the heat of combustion generated in said combustion catalyst bed means and transfer it to said gasification catalyst beds.

2. An apparatus as claimed in claim 1 in which each of said heat pipes is closed and the interior of it is maintained at a high vacuum, each of said heat pipes being packed with sodium metal or lithium metal.

3. An apparatus as claimed in claim 1 in which external fins are provided on the vaporization sections of said heat pipes, said fins extending into said combustion catalyst bed means.

4. An apparatus as claimed in claim 1 in which said withdrawing tube means comprises a withdrawing tube in each of said gasification catalyst beds, each withdrawing tube being helically wound around the heat pipe in its associated gasification catalyst bed.

* * * * *